United States Patent
Magpayo

(10) Patent No.: US 9,830,119 B1
(45) Date of Patent: Nov. 28, 2017

(54) IMAGE PROCESSING APPARATUS FOR GENERATING NEW DOCUMENT IMAGE AND COMPUTER-READABLE NON-TRANSITORY RECORDING MEDIUM WITH IMAGE PROCESSING PROGRAM STORED THEREON

(71) Applicant: KYOCERA Document Solutions Inc., Osaka (JP)

(72) Inventor: Ruell Magpayo, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days.

(21) Appl. No.: 15/335,753

(22) Filed: Oct. 27, 2016

(30) Foreign Application Priority Data

Oct. 6, 2016 (JP) .................................. 2016-198488

(51) Int. Cl.
*G06F 3/12* (2006.01)

(52) U.S. Cl.
CPC .......... *G06F 3/1243* (2013.01); *G06F 3/1205* (2013.01); *G06F 3/1208* (2013.01); *G06F 3/1275* (2013.01); *G06F 3/1288* (2013.01)

(58) Field of Classification Search
None
See application file for complete search history.

(56) References Cited

U.S. PATENT DOCUMENTS

| 2004/0141207 A1* | 7/2004 | Warmus | B42C 19/00 358/1.18 |
| 2005/0168782 A1* | 8/2005 | Kobashi | G06F 17/243 358/1.18 |
| 2006/0193008 A1* | 8/2006 | Osaka | G06F 17/211 358/1.18 |
| 2007/0046996 A1* | 3/2007 | Matsuda | H04N 1/00196 358/1.18 |
| 2008/0225332 A1* | 9/2008 | Saito | G06F 3/1211 358/1.15 |

FOREIGN PATENT DOCUMENTS

| JP | 2002-108590 A | 4/2002 |
| JP | 2011-233104 A | 11/2011 |

* cited by examiner

*Primary Examiner* — Thomas D Lee
(74) *Attorney, Agent, or Firm* — IP Business Solutions, LLC

(57) ABSTRACT

An image processing apparatus includes a file specification acceptance section, a form storage section, a placement area storage section, a placement area acceptance section, a save location storage section, a data extracting section, and an image generating section. The save location storage section stores a save location indicating a location in a file accepted by the file specification acceptance section, the location being where a piece of data to be placed in a placement area accepted by the placement area acceptance section is saved. The data extracting section extracts, from the accepted file, the piece of data saved in the location in the file indicated by the save location stored in the save location storage section. The image generating section generates an image in which the extracted piece of data is placed in the accepted placement area in the document stored in the form storage section.

5 Claims, 15 Drawing Sheets

IMAGE PROCESSING APPARATUS FOR GENERATING NEW DOCUMENT IMAGE AND COMPUTER-READABLE NON-TRANSITORY RECORDING MEDIUM WITH IMAGE PROCESSING PROGRAM STORED THEREON

INCORPORATION BY REFERENCE

This application claims priority to Japanese Patent Application No. 2016-198488 filed on Oct. 6, 2016, the entire contents of which are incorporated by reference herein.

BACKGROUND

The present disclosure relates to image processing apparatuses and computer-readable non-transitory recording media with image processing programs stored thereon and particularly relates to a technique for using data saved in a file to apply it to a different document, thus generating a new document image.

A technique is known for using data saved in a file to apply it to a different document, thus generating a new document image. For example, there is an information processing system in which a spread sheet file created by spread sheet software is used to load a form screen to a screen design editor in a workflow system. This image processing system is designed so that if a form constituted by a spread sheet file created by spread sheet software is already present, a new form can be created using the spread sheet file even when the workflow system has already employed its own screen design.

SUMMARY

A technique improved over the aforementioned technique is proposed as one aspect of the present disclosure.

An image processing apparatus according to an aspect of the present disclosure includes a file specification acceptance section, a form storage section, a placement area storage section, a placement area acceptance section, a save location storage section, a data extracting section, and an image generating section.

The file specification acceptance section accepts a specification of a file to be a source to load data.

The form storage section stores a document for use as a form in generating a document image.

The placement area storage section stores a plurality of placement areas indicating locations in the document stored in the form storage section, each of the locations being where a piece of the data extracted from the file the specification of which has been accepted by the file specification acceptance section is placeable.

The placement area acceptance section accepts a specification of one placement area from the plurality of placement areas stored in the placement area storage section, the one placement area being for use of placement of the extracted piece of data.

The save location storage section stores a save location indicating a location in the file the specification of which has been accepted by the file specification acceptance section, the location being where the piece of data to be placed in the placement area the specification of which has been accepted by the placement area acceptance section is saved.

The data extracting section extracts, from the file the specification of which has been accepted by the file specification acceptance section, the piece of data saved in the location in the file indicated by the save location stored in the save location storage section.

The image generating section generates an image in which the piece of data extracted by the data extracting section is placed in the placement area the specification of which has been accepted by the placement area acceptance section, the placement area being located in the document stored in the form storage section.

A computer-readable non-transitory recording medium according to another aspect of the present disclosure contains an image processing program stored thereon.

The image processing program allows a computer to function as the file specification acceptance section, the form storage section, the placement area storage section, the placement area acceptance section, the save location storage section, the data extracting section, and the image generating section.

DETAILED DESCRIPTION

Figure 1:
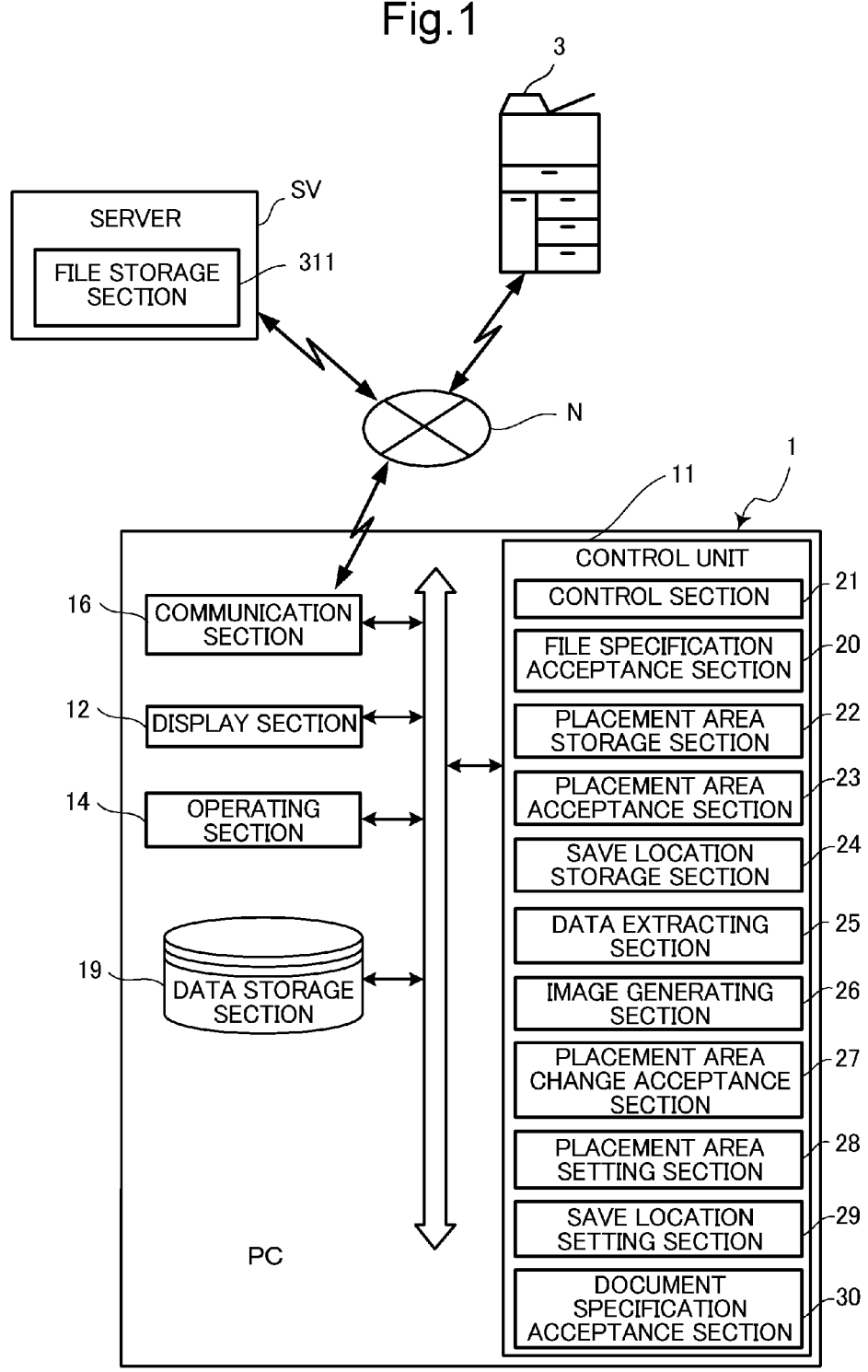
FIG. 1 is a block diagram showing an electrical configuration of a personal computer serving as an image processing apparatus according to one embodiment of the present disclosure.

Hereinafter, a description will be given of an image processing apparatus according to one embodiment of the present disclosure with reference to the drawings. FIG. 1 is a block diagram showing an electrical configuration of a personal computer serving as an image processing apparatus according to one embodiment of the present disclosure.

A personal computer (hereinafter referred to as a PC) 1 serving as an image processing apparatus according to one embodiment of the present disclosure includes a control unit 11, a display section 12, an operating section 14, a communication section 16, and a data storage section 19. These components are capable of data or signal transfer via a bus among them.

The display section 12 is formed of a liquid crystal display (LCD), an organic light-emitting diode (OLED) display or the like.

The operating section 14 is an input device, such as a keyboard or a mouse, and has the function of accepting entry of instructions on various operations from a user.

The communication section 16 is a communication interface including a communication module and has the function of sending and receiving data to and from an image forming apparatus 3, a server SV, and so on via a network N formed of a LAN, a public line or the like.

The data storage section 19 is a storage device, such as an HDD (hard disk drive). The data storage section 19 stores documents (to be described hereinafter) each for use as a form in generating a new document image during regular printing. Examples of the document include a text file created by a word processor application, a spread sheet file created by spread sheet software, and image data created in JPEG or other formats. The data storage section 19 is an example of the form storage section defined in What is claimed is.

Furthermore, the data storage section 19 stores, for the purpose of generating the new document image, files in which data to be loaded into the documents is saved. Alternatively, the files may be stored on a storage device (a file storage section 311 shown in FIG. 1), such as an HDD, provided in the server SV. Examples of the file include a text file created by a word processor application and a spread sheet file created by spread sheet software.

The control unit 11 is formed of a processor, a RAM (random access memory), a ROM (read only memory), and so on. The processor is, for example, a CPU (central processing unit), an MPU or an ASIC. When an image processing program stored in the data storage section 19 is executed by the above processor, the control unit 11 functions as a control section 21, a file specification acceptance section 20, a placement area storage section 22, a placement area acceptance section 23, a save location storage section 24, a data extracting section 25, an image generating section 26, a placement area change acceptance section 27, a placement area setting section 28, a document specification acceptance section 30, and a save location setting section 29. Alternatively, each of the control section 21, the file specification acceptance section 20, the placement area storage section 22, the placement area acceptance section 23, the save location storage section 24, the data extracting section 25, the image generating section 26, the placement area change acceptance section 27, the placement area setting section 28, the document specification acceptance section 30, and the save location setting section 29 of the control unit 11 may not be implemented by the operation of the control unit 11 in accordance with the above image processing program but may be constituted by a hardware circuit.

The control section 21 governs the overall operation control of the PC 1.

The file specification acceptance section 20 accepts, in accordance with a user's operation of the operating section 14, the specification of a file to be a source to load data into a specified document from among the files stored in the data storage section 19 or the files stored on the storage device (file storage section 311 shown in FIG. 1) of the server SV.

The placement area storage section 22 stores a plurality of placement areas indicating locations in an image indicated by the specified document stored in the data storage section 19, the locations being where pieces of data extracted by the data extracting section 25 from the file the specification of which has been accepted by the file specification acceptance section 20 are to be placed. In short, the placement area is a location where the extracted individual piece of data is to be placed in the image indicated by the document.

The placement area acceptance section 23 accepts, in accordance with a user's operation of the operating section 14, the specification of one placement area for use of placement of the extracted individual piece of data from the plurality of placement areas stored in the placement area storage section 22, in generating a new document image by the image generating section 26.

The save location storage section 24 stores a save location indicating a location in the file the specification of which has been accepted, the location being where a piece of data to be placed in the placement area the specification of which has been accepted is saved. In other words, the save location refers to information indicating, when the user specifies a placement area in the above manner, a piece of data contained in which location in the file is to be used as the piece of data to be placed in the placement area. Each save location is stored in association with the relevant placement area in the save location storage section 24.

The data extracting section 25 extracts, from the file the specification of which has been accepted by the file specification acceptance section 20, a piece of data saved in a location in the file indicated by the save location stored in the save location storage section 24. For example, when the file is stored in the data storage section 19, the data extracting section 25 reads out the piece of data saved in a location that is indicated by the above save location and located in, among files stored in the data extracting section 19, the file the specification of which has been accepted. On the other hand, when the file is stored on the storage device (file storage section 311) of the server SV, the data extracting section 25 accesses the server SV, acquires the file from the storage device, and reads the piece of data saved in a location in the acquired file indicated by the above save location.

The image generating section 26 places the piece of data extracted by the data extracting section 25 into the placement area which is located in the document stored in the data storage section 19 and the specification of which has been accepted by the placement area acceptance section 23 to generate an image in which an image representing the piece of data is synthesized with an image indicated by the document, thus generating a new document image as described above.

The placement area change acceptance section 27 accepts, based on a user's operation of the operating section 14, an instruction to add a placement area stored in the placement area storage section 22.

The placement area setting section 28 adds, in accordance with the above instruction to add a placement area accepted by the placement area change acceptance section 27, the placement area stored in the placement area storage section 22.

The save location setting section 29 changes, in accordance with a user's instruction based on a user's operation of the operating section 14, the save location indicating a location in the above file where the piece of data to be placed in the placement area is saved, the location of the placement area being stored in the placement area storage section 22. Furthermore, when a placement area is added by the placement area setting section 28, the save location setting section 29 sets, in accordance with a user's instruction based on a user's operation of the operating section 14, a save location indicating a location in the above file where a piece of data to be placed in the added placement area is saved.

The document specification acceptance section 30 accepts, in accordance with a user's instruction based on a user's operation of the operating section 14, the specification of one document from the plurality of documents stored in the data storage section 19, the one document being for use as a form in generating a new document image during regular printing.

Figure 2:
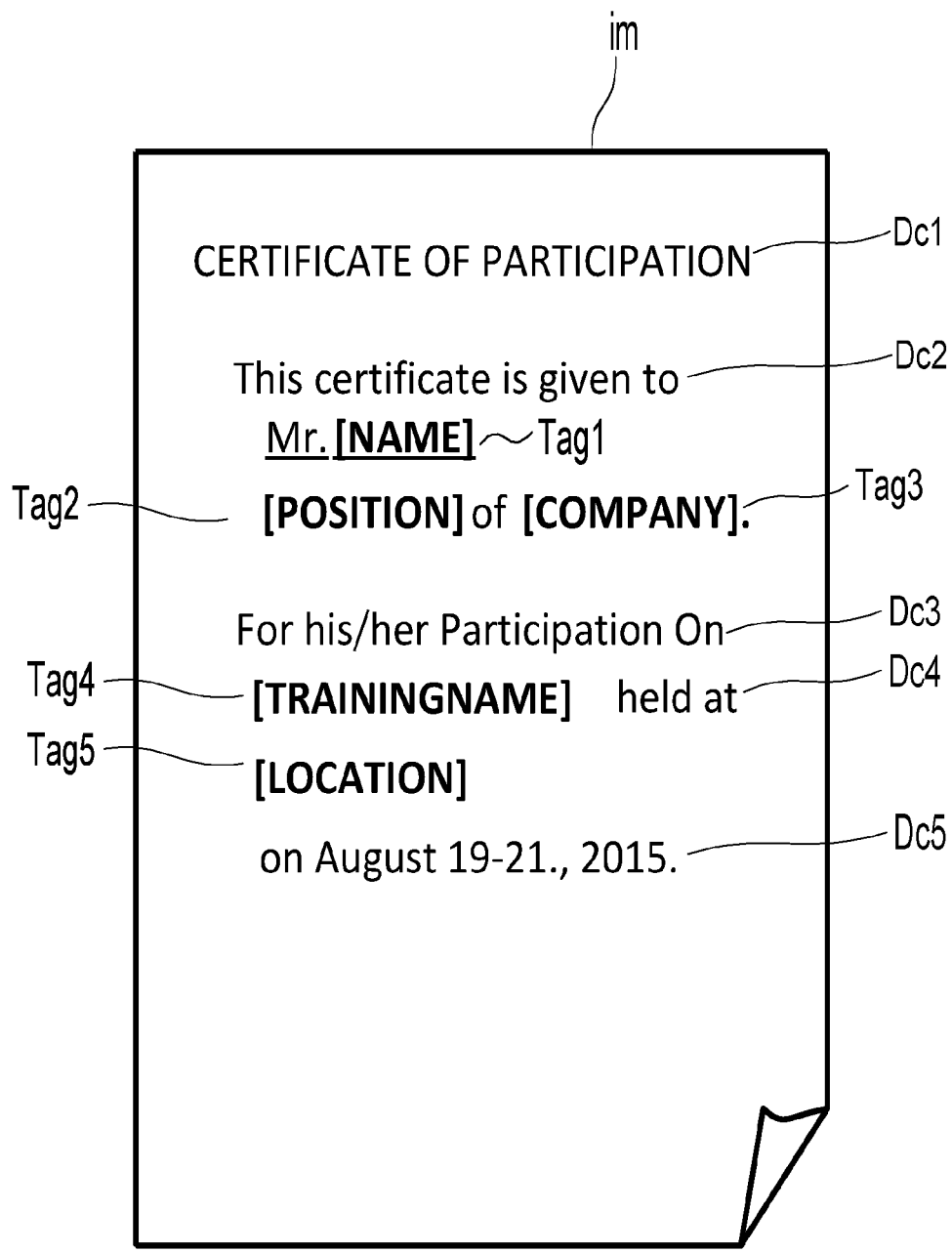
FIG. 2 is a view showing an image indicated by a document for use as a form in generating a new document image during regular printing.

Next, a description will be given of an above-mentioned document for use as a form in generating a new document image during regular printing and an above-mentioned placement area. FIG. 2 is a view showing an image indicated by a document for use as a form in generating a new document image during regular printing.

As shown in FIG. 2, in relation to the document for use as a form, placement areas Tag1 to Tag5 where images indicating user-desired characters, for example, can be applied and placed are set in an image im indicated by the document. These placement areas Tag1 to Tag5 are set at predetermined locations in the image im indicated by the document and information on the locations is stored in the placement area storage section 22. Each placement area is represented by, for example, (1) a coordinate indicating a location in the image im indicated by the document or (2), if the document is a word processor file or spread sheet file, file-specific location information set by the application involved in creating the file.

The image im indicated by the document contains the placement areas Tag1 to Tag5 and fixed text areas Dc1 to Dc5. For example, the placement areas Tag1 to Tag5 are designed to be a NAME tag Tag1 for placement of a personal name, a POSITION tag Tag2 for placement of a person's position, a COMPANY tag Tag3 for placement of a company, organization or the like to which the person belongs, a TRAININGNAME tag Tag4 for placement of the name of a training, and a LOCATION tag Tag5 for placement of the location of the training. The data storage section 19 stores a plurality of documents as forms and the placement area storage section 22 stores, on a document-by-document basis, a plurality of placement areas in each document. The fixed text areas Dc1 to Dc5 are areas where original image parts contained in the image im indicated by the document are used for printing as they are.

The image im shown in FIG. 2 is an image for use in printing a certificate of participation. In the case of a document like the certificate of participation, an image representing the word "CERTIFICATE OF PARTICIPATION" indicating a certificate of participation is printed as a shared image among the certificates of participation for all participants in issuing them to all the participants. Unlike this, the words representing elements like a participant's name indicating an individual participant (NAME), a participant's position (POSITION), and an organization to which an individual participant belongs (COMPANY) are changed for each participant and the words representing elements like the name of a training subject to the certification of participation (TRAININGNAME) and the location of the training (LOCATION) are changed for each training. Therefore, in the image im indicated by the document, these elements are set as the placement areas Tag1 to Tag5. In other words, the data storage section 19 stores a plurality of documents in each of which placement areas are set like this.

Figure 3:
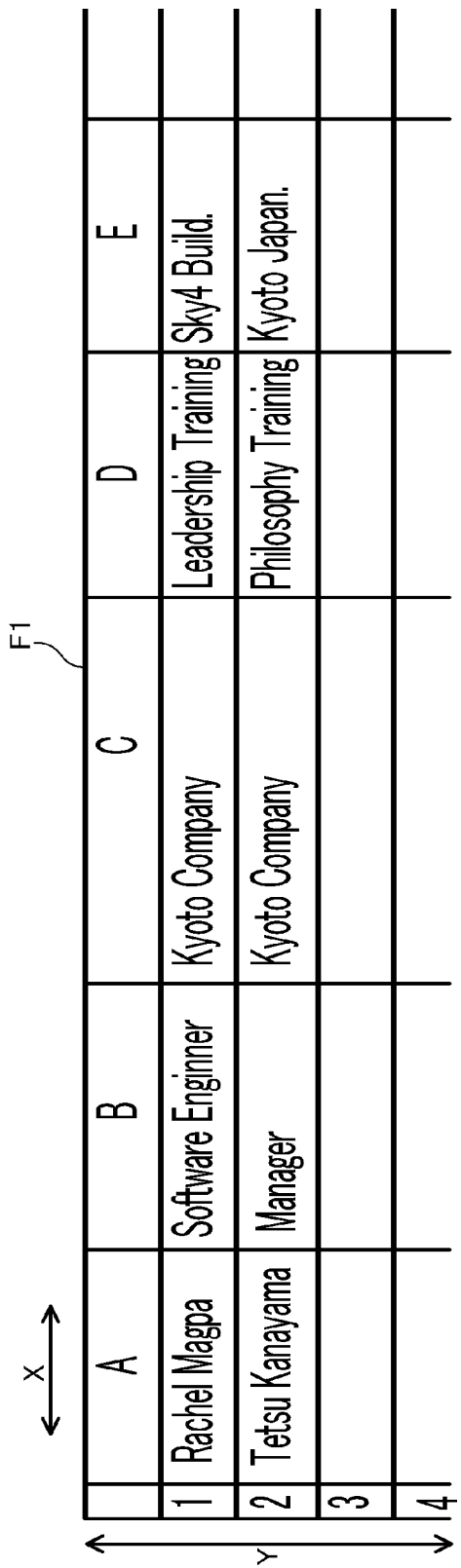
FIG. 3 is a table shown in such a manner that pieces of data saved in a file are arranged based on a row and column concept.

Subsequently, a description will be given of a file for use in loading data. FIG. 3 is a table shown in such a manner that pieces of data saved in a file are arranged based on a row and column concept. As described previously, the file contains pieces of data to be loaded into the document and placed in the placement areas. FIG. 3 shows an example where the file F1 is a spread sheet file created by a spread sheet application. As shown in FIG. 3, in the file F1, the location where each piece of data is saved is indicated by, for example, information of a column (indicating a position in the X direction in FIG. 3 and represented by one of the letters A to E in FIG. 3) and a row (indicating a position in the Y direction in FIG. 3 and represented by one of the values 1 to 4 in FIG. 3), both given by the spread sheet application. The save location described previously is represented by such a combination of column and row. For each file, a plurality of save locations are stored in association with the individual relevant placement areas in the save location storage section 24. Therefore, the data extracting section 25 reads, based on information of combinations of column and row, pieces of data to be loaded into the document from the file F1.

For example, in the case of the file F1 shown in FIG. 3, when the save location associated with the NAME tag is a combination of row 1 and column A, the data extracting section 25 reads "Rachel Magpa" from the file F1. When the save location associated with the POSITION tag is a combination of row 1 and column B, the data extracting section 25 reads "Software Engineer" from the file F1. When the save location associated with the COMPANY tag is a combination of row 1 and column C, the data extracting section 25 reads "Kyoto Company" from the file F1.

In this manner, the user allows each desired piece of data to be stored in a location in a file represented by a combination of row and column and serving as a save location associated with a placement area. Thus, the user can place desired pieces of data in the individual relevant placement areas to generate a new document image.

Figure 4:
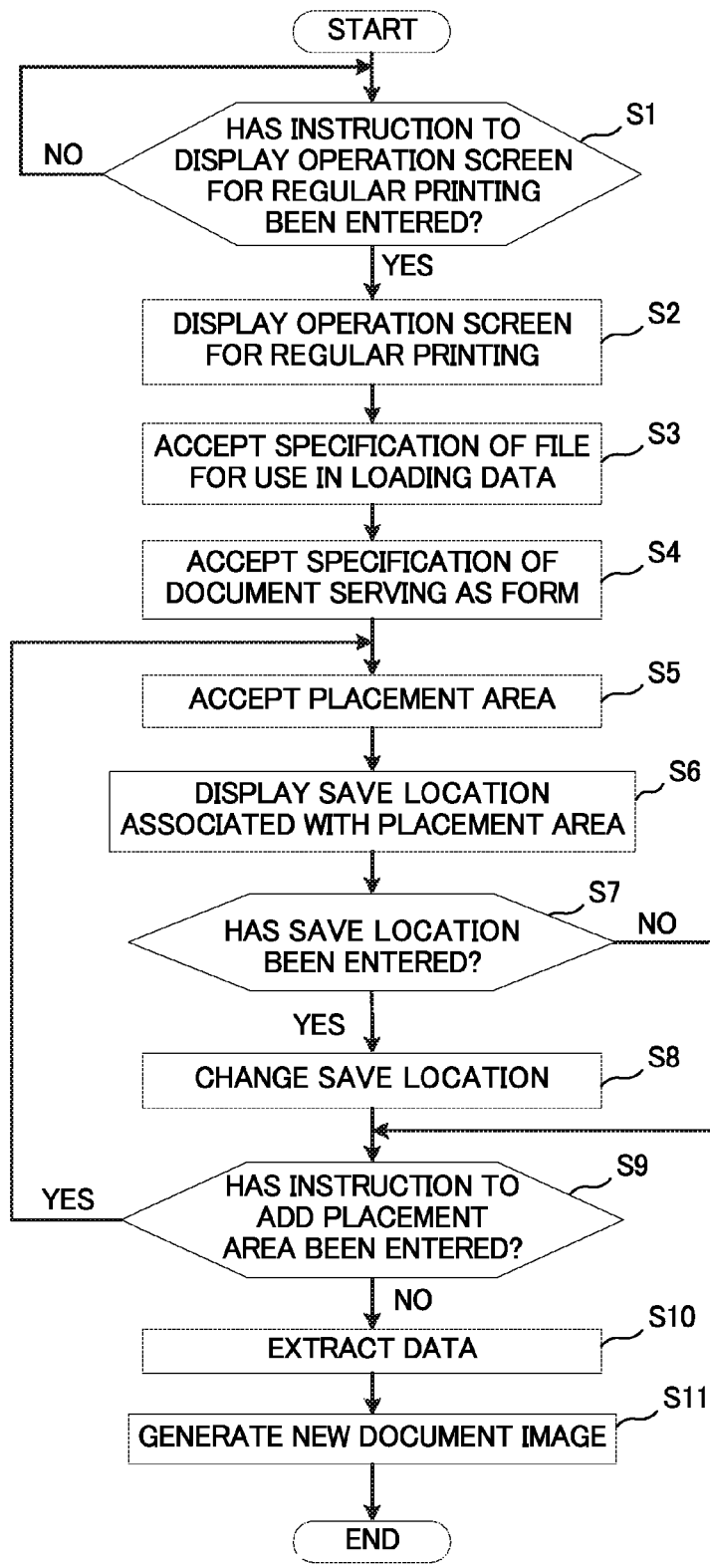
FIG. 4 is a flowchart showing regular printing processing for generating the new document image on the personal computer.

Next, a description will be given of regular printing processing for generating a new document image on the PC 1. FIG. 4 is a flowchart showing the regular printing processing for generating a new document image on the PC 1. FIGS. 5 to 11 are views showing an operation screen serving as a user interface displayed on the display section 12 during execution of the regular printing processing.

In loading pieces of data in a file into a different document to generate a new document image, the user runs an image processing program on the PC 1 to make the PC 1 ready to perform the regular printing processing for generating a new document image. Suppose that in this embodiment the image processing program has already been run on the PC 1.

Figure 5:
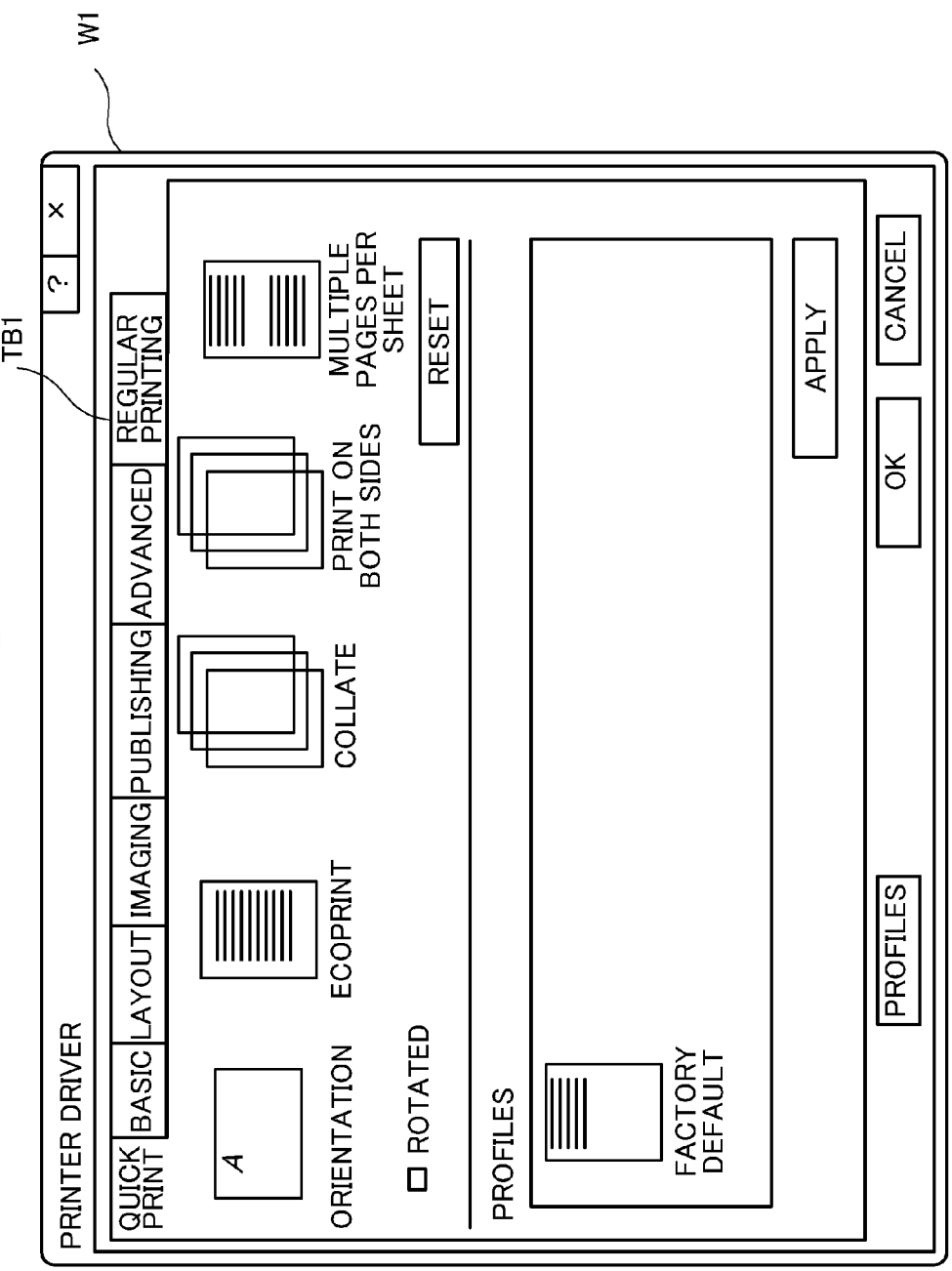
FIG. 5 is a view showing an operation screen serving as a user interface displayed on a display section during execution of the regular printing processing.

For example, when a printer driver has also been run on the PC 1, the control section 21 allows a printer driver screen W1 shown as an example in FIG. 5 to be displayed. At this time, a regular printing tab TB1 for accepting entry of an instruction to display an operation screen for regular printing is displayed on the printer driver screen W1.

The term "regular printing" used in this embodiment refers to processing for inserting at least one image indicated by a piece of data acquired from a file into a partial area (placement area) in a different document for use as a form to generate a new document image and printing the new document image.

Figure 6:
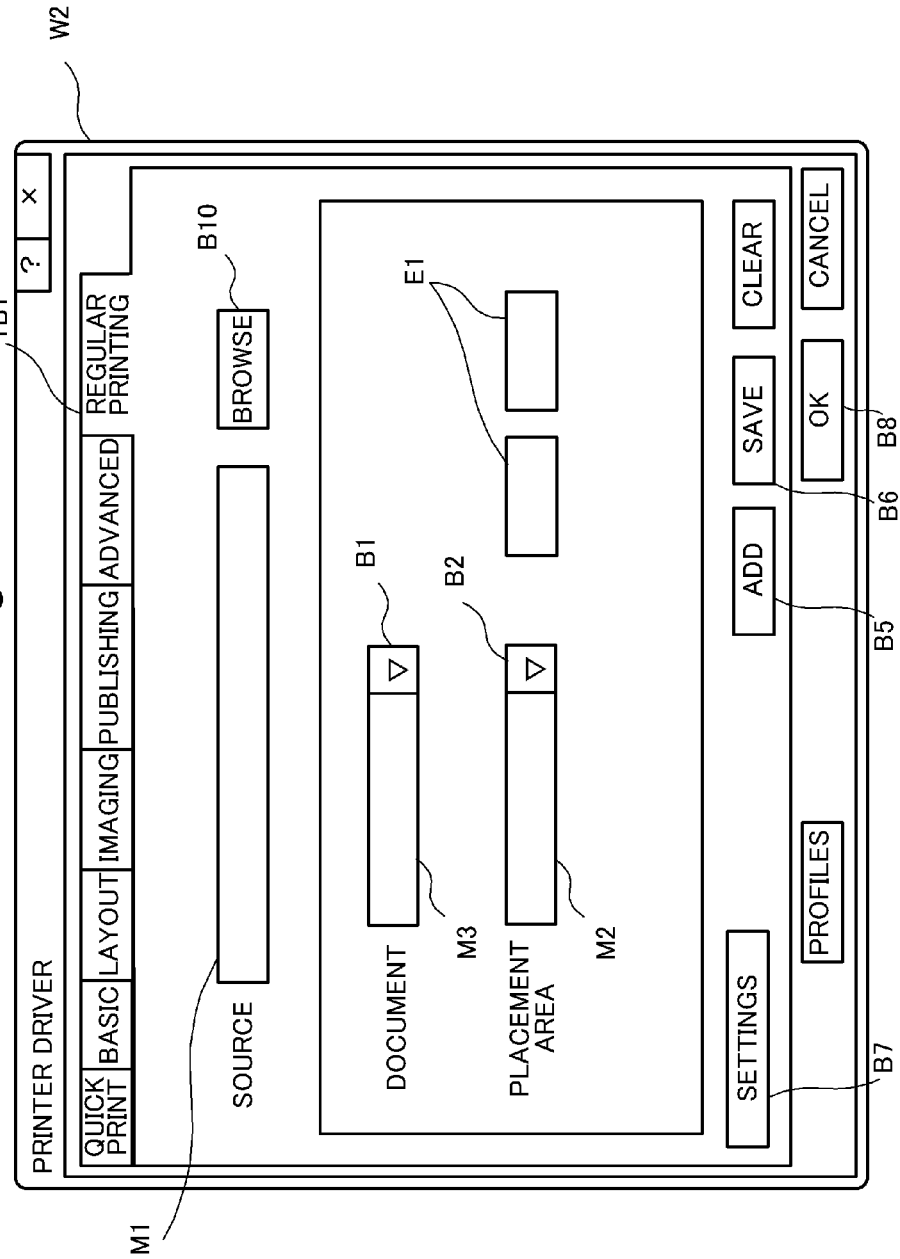
FIG. 6 is a view showing an operation screen serving as a user interface displayed on the display section during execution of the regular printing processing.

When during display of the printer driver screen W1 the user provides a click or other selection action on the display position of the regular printing tab TB1, for example, through a mouse as the operating section 14 to enter an instruction to display an operation screen for regular printing (YES in S1), the control section 21 accepts this instruction and allows the display section 12 to display the operation screen W2 for regular printing shown as an example in FIG. 6 (S2).

Items displayed on this operation screen W2 include a file specification field M1 for specifying a file for use in loading a piece of data as described above, a document specification field M3 for specifying a document for use as a form for the regular printing, and a placement area specification field M2 for specifying a placement area.

Figure 7:
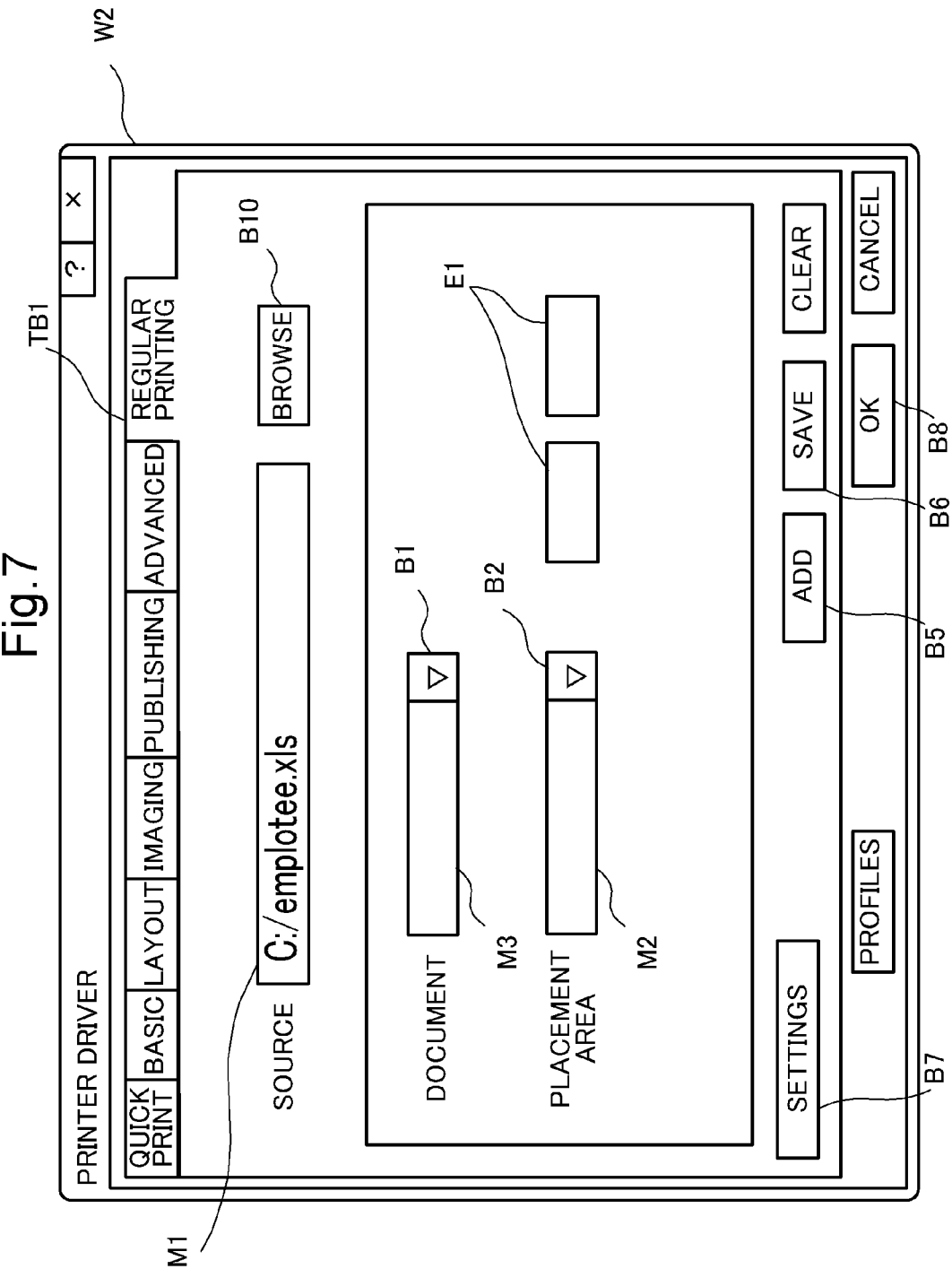
FIG. 7 is a view showing the operation screen serving as a user interface displayed on the display section during execution of the regular printing processing.

When during display of this operation screen W2 the user provides a click or other selection action on the file specification field M1 through the mouse serving as the operating section 14, then enters a title of a file for use in loading pieces of data as shown as an example in FIG. 7 through a keyboard serving as the operating section 14, and then provides a click or other selection action on a browse button B10 displayed on the operation screen W2 through the operating section 14, the file specification acceptance section 20 reads a file having the same title as the entered title from the data storage section 19 and accepts the file as a file for use in loading pieces of data during regular printing (S3). Alternatively, the file specification acceptance section 20 may acquire a file having the same title as the entered title from the server SV through the communication section 16 and accept the file as a file for use in loading pieces of data during regular printing.

Figure 8:
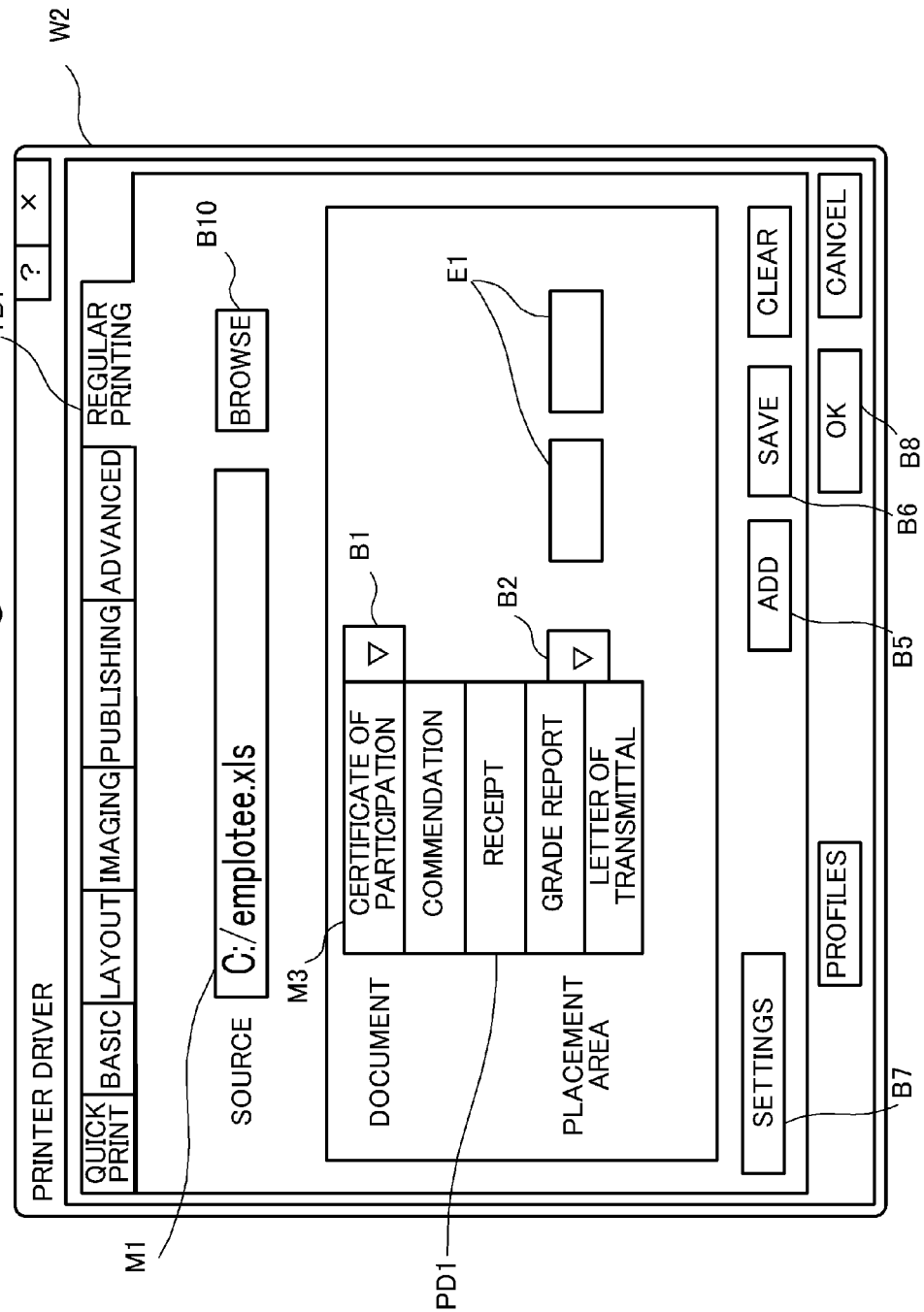
FIG. 8 is a view showing the operation screen serving as a user interface displayed on the display section during execution of the regular printing processing.

Subsequently, when the user provides a click or other selection action on a button B1 next to the document specification field M3, the control section 21 allows document titles of all documents stored as documents for use as forms for regular printing in the data storage section 19 to be displayed in a pull-down image PD1 downwardly from the document specification field M3 as shown as an example in FIG. 8.

When during display of this pull-down box the user provides a click or other selection action on a display portion of a document title indicating a desired document, for example, that of "Certificate of Participation", through the operating section 14, the document specification acceptance section 30 accepts the specification of a document having a title "Certificate of Participation" as a form for use in regular printing (S4).

Figure 9:
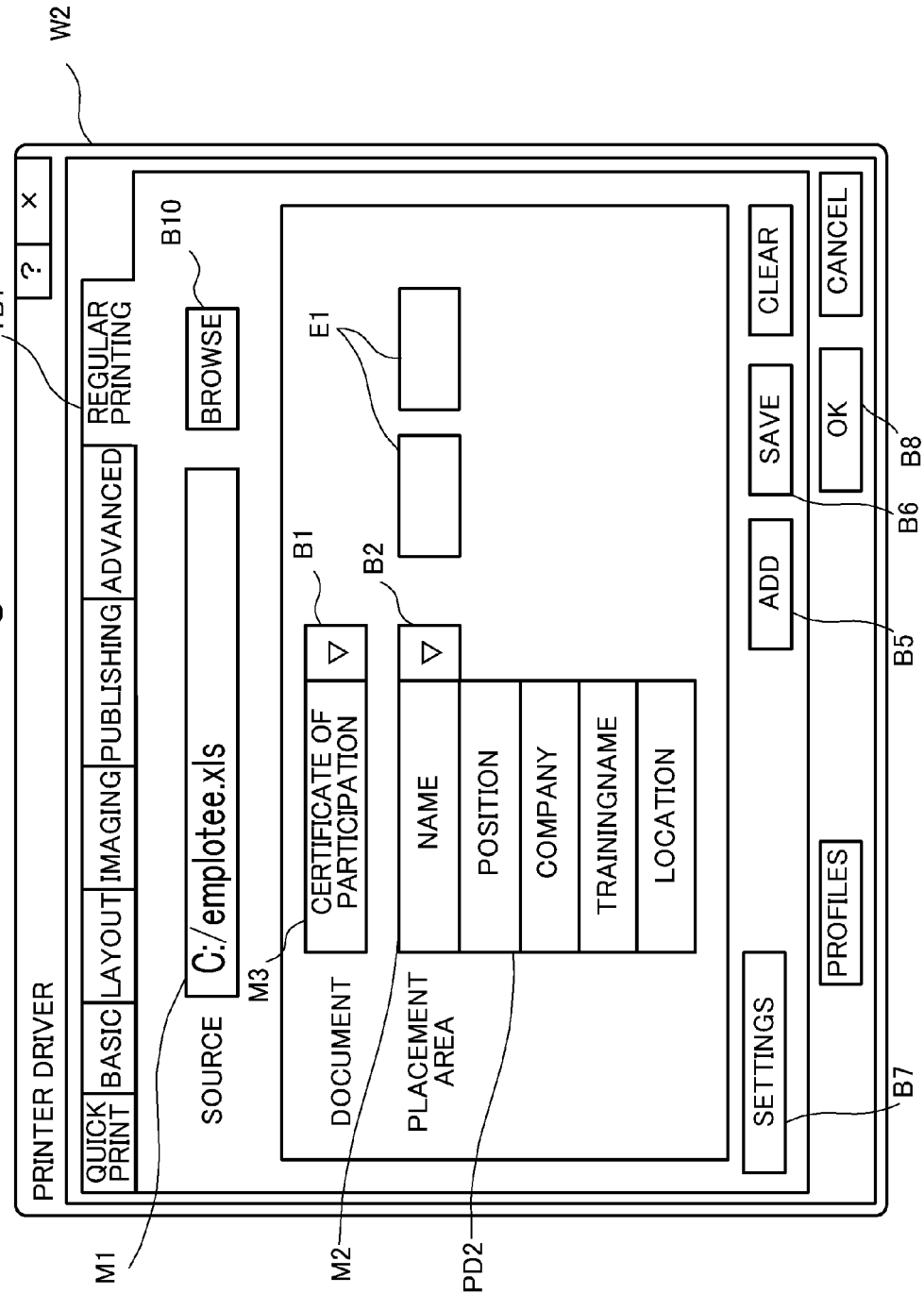
FIG. 9 is a view showing the operation screen serving as a user interface displayed on the display section during execution of the regular printing processing.

When the user provides a click or other selection action on a button B2 next to the placement area specification field M2 through the operating section 14 after the specification of a document has been accepted, the control section 21 allows the names indicating names of all placement areas stored in the placement area storage section 22 in relation to the document the specification of which has been accepted to be displayed in a pull-down image PD2 downwardly from the placement area specification field M2 on the operation screen W2 as shown in FIG. 9.

When during display of this pull-down box the user provides a click or other selection action on a display portion of the name of a desired placement area, for example, that of "NAME", through the operating section 14, the placement area acceptance section 23 accepts the specification of the placement area where a piece of data loaded from the file accepted in S3 is to be placed, with the specified placement area as the NAME tag Tag1 (S5).

Figure 10:
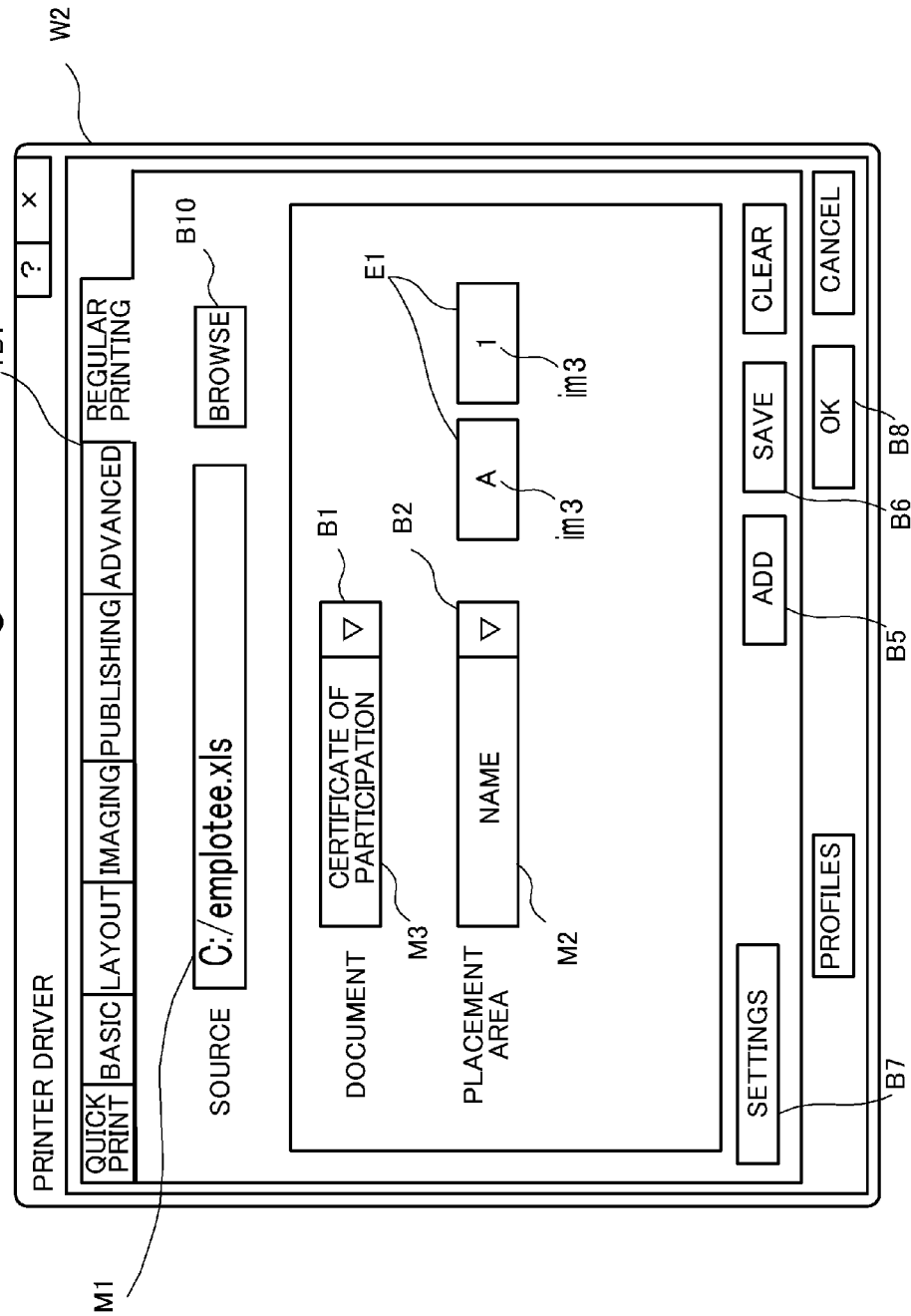
FIG. 10 is a view showing the operation screen serving as a user interface displayed on the display section during execution of the regular printing processing.

Upon acceptance of the placement area, as shown as an example in FIG. 10, the control section 21 allows an image im3 representing the save location stored in the save location storage section 24 in association with the placement area accepted in S5 in relation to the document accepted in S4 to be displayed in a save location display field E1 in line with the placement area specification field M2 (S6). Specifically, the control section 21 allows information indicating a piece of data contained in which location in the file accepted in S3 is to be used as the piece of data to be placed in the placement area accepted in S5, or information indicating a combination of row and column in this embodiment, to be displayed in the save location display field E1.

When in this state the user provides a click or other select action on the save location display field E1 through the operating section 14 and enters information indicating desired row and column, for example, through the keyboard serving as the operating section 14 (YES in S7), the save location storage section 24 changes the save location having been stored in association with the accepted placement area until entry of the information to a save location indicated by the entered information (S8). On the other hand, if there is no information indicating desired row and column from the user (NO in S7), the process skips S8 and proceeds to S9.

Figure 11:
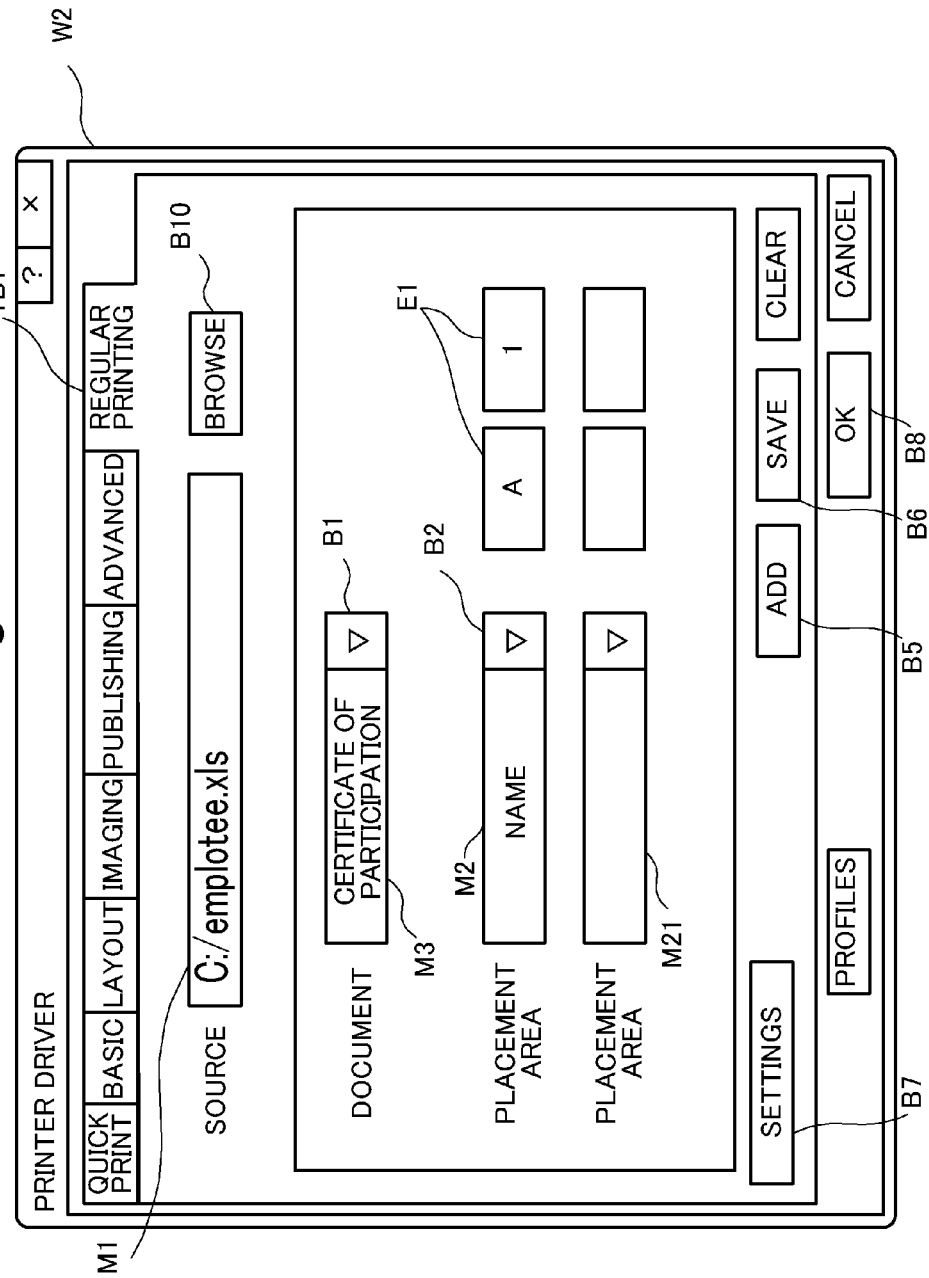
FIG. 11 is a view showing the operation screen serving as a user interface displayed on the display section during execution of the regular printing processing.

When in this state the user provides a click or other selection action on an Add button B5 displayed on the operation screen W2 through the operating section 14, an instruction to add a placement area into the document accepted in S4 is accepted by the control section 21 (YES in S9) and the control section 21 allows an additional placement area specification field M21 to be displayed on the operation screen W2 as shown as an example in FIG. 11. In this case, the process goes back to S5 and the processing for accepting a placement area and the processing for changing a save location are performed again in the same manner as above (S5 to S8).

On the other hand, when the user enters no instruction to add any placement area (NO in S9) and provides a click or other selection action on a Save button B6 through the operating section 14, the data extracting section 25 extracts a piece of data saved in a location in a file indicated by the save location stored in the save location storage section 24 in association with the placement area accepted in S5 (S10).

When the user subsequently provides a click or other selection action on an execution (OK) button B8 through the operating section 14, the image generating section 26 generates a new document image in which an image indicated by each piece of data extracted in S10 is placed in the relevant placement area in the image indicated by the document accepted in S4, the placement area having been accepted in S5 (S11). Furthermore, the control section 21 allows the communication section 16 to send the generated new document image to the image forming apparatus 3. The generated new document image is subjected to printing or other image formation on the image forming apparatus 3.

Figure 12:
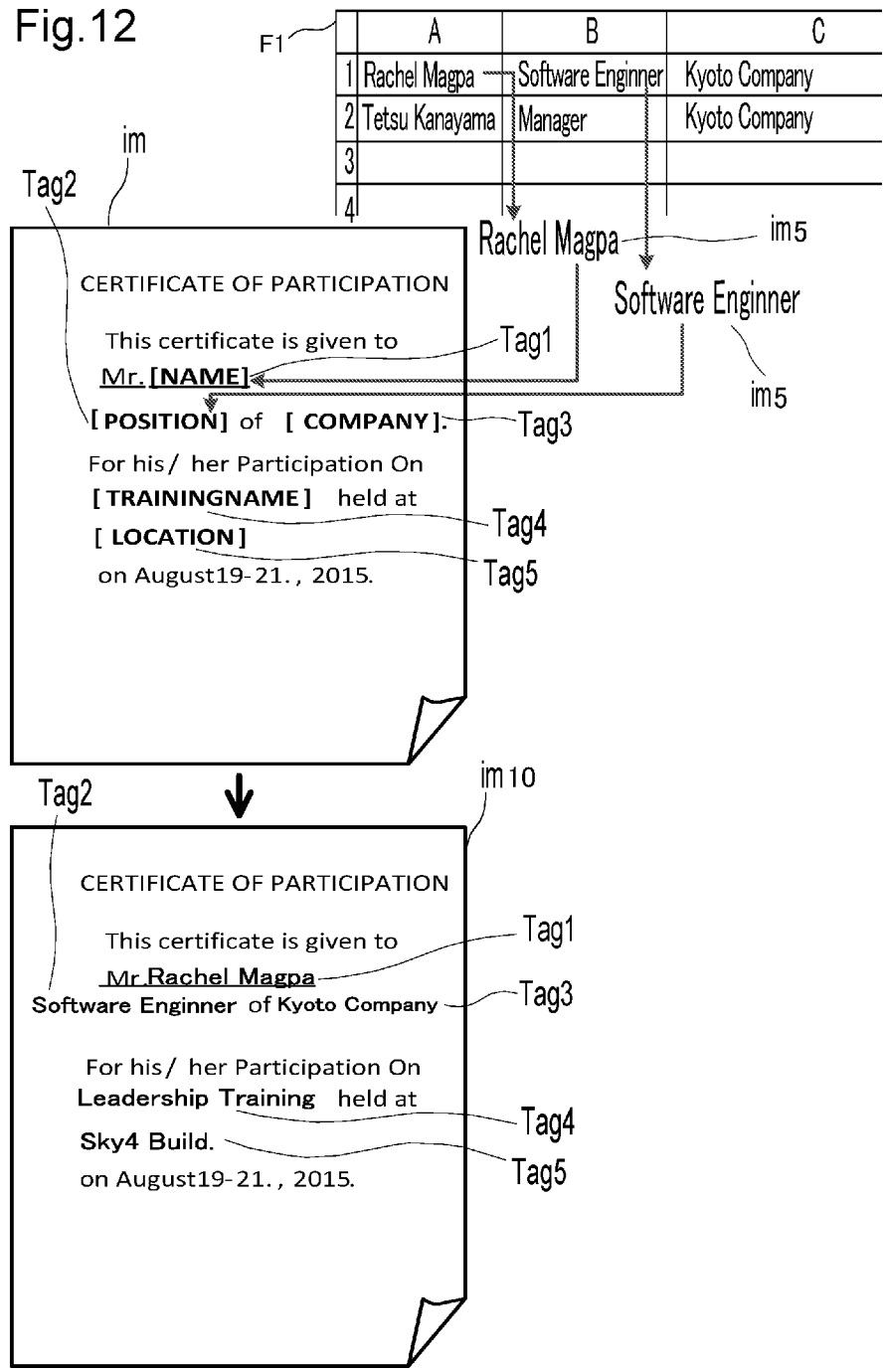
FIG. 12 shows bit-mapped images representing pieces of data extracted from the file, the image indicated by the document, and a new document image generated by synthesizing the bit-mapped images and the image indicated by the document.

For example, as shown in FIG. 12, the image generating section 26 first generates from the document a bit-mapped image forming the image im indicated by the document, further generates, based on pieces of data extracted from the file F1 in S10, bit-mapped images im5 representing the pieces of data, and places the bit-mapped images im5 representing the pieces of data into locations in the bit-mapped image forming the image im indicated by the document, the locations corresponding to the placement areas accepted in S5, to synthesize these bit-mapped images, thus generating a new document image im10 (shown as an example in FIG. 12).

As thus far described, according to this embodiment, a new document image can be generated and printed simply by user's settings of a desired form, a file for use in locating pieces of data, and placement areas into which the loaded pieces of data are to be placed. Therefore, in loading pieces of data in a file into a different document to generate a new document image, desired pieces of data can be placed into desired placement locations with a simple operation to generate the new document image.

For example, in the information processing system described in BACKGROUND, it is possible to generate a document by loading pieces of data in a file into a different document, but it is impossible to generate an image by specifying in which locations in the different document the pieces of data in the file are to be placed or which pieces of data in the file are to be applied and loaded into the document. Unlike this conventional technique, according to this embodiment, in loading pieces of data in a file into a different document to generate a new document image, desired pieces of data can be placed into desired placement locations with a simple operation to generate the new document image.

Figure 13:
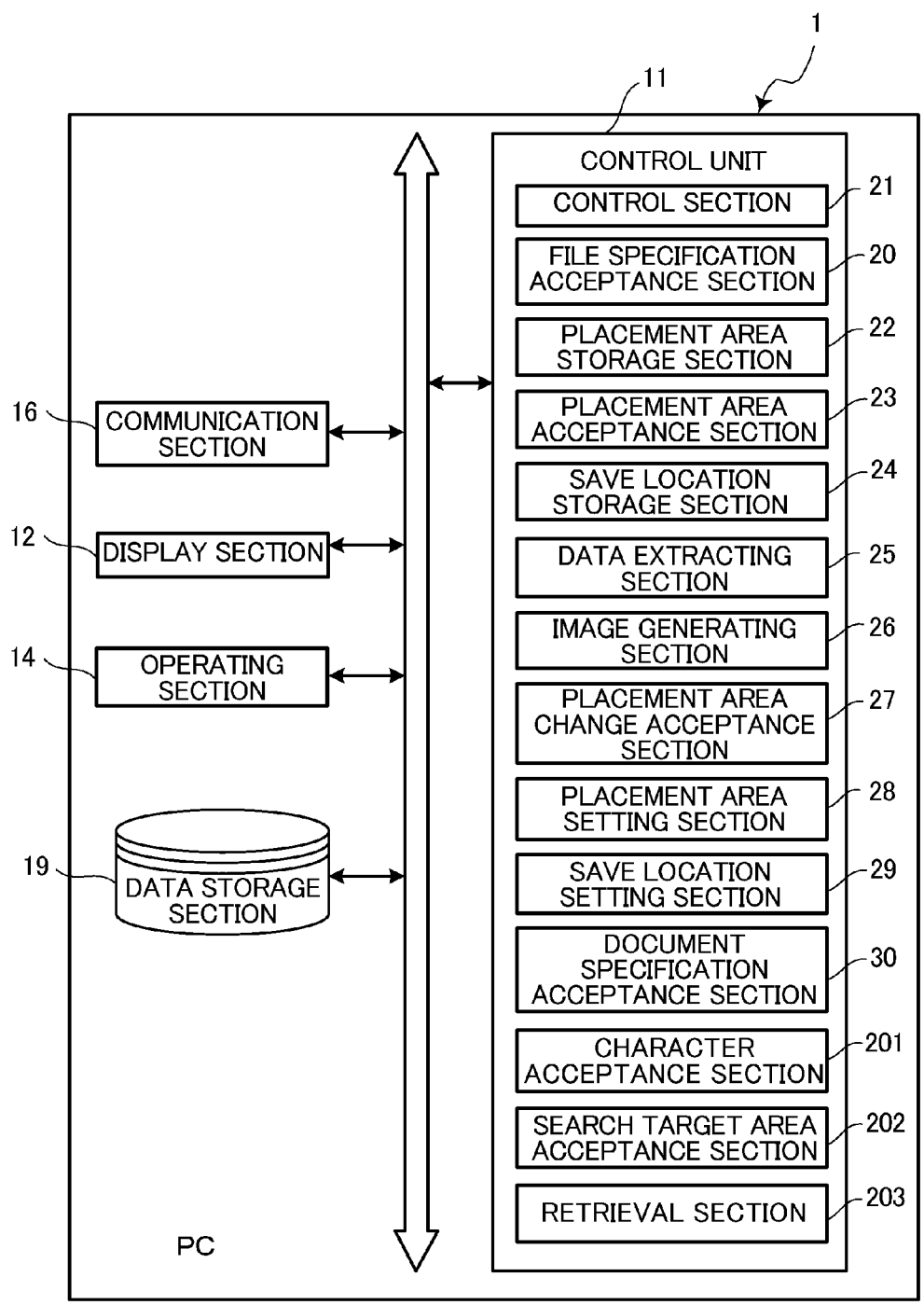
FIG. 13 is a block diagram showing an electrical configuration of a personal computer that can perform a second embodiment of processing for acquiring a piece of data.

Next, a description will be given of a second embodiment of processing for acquiring a piece of data to be placed in a placement area during regular printing processing on a PC 1. FIG. 13 is a block diagram showing an electrical configuration of a PC 1 that can perform the second embodiment of the processing for acquiring a piece of data. Further explanation of the same configuration as in the PC1 shown in FIG. 1 will be omitted.

In this embodiment, the PC 1 further includes a character acceptance section 201, a search target area acceptance section 202, and a retrieval section 203.

The character acceptance section 201 accepts a character or characters targeted for search based on a user's operation of the operating section 14.

The search target area acceptance section 202 accepts, based on a user's operation of the operating section 14, the specification of a search target area where the character or characters accepted by the character acceptance section 201 are to be searched for.

The retrieval section 203 searches for and retrieves the character or characters accepted by the character acceptance section 201 from the search target area accepted by the search target area acceptance section 202.

Figure 14:
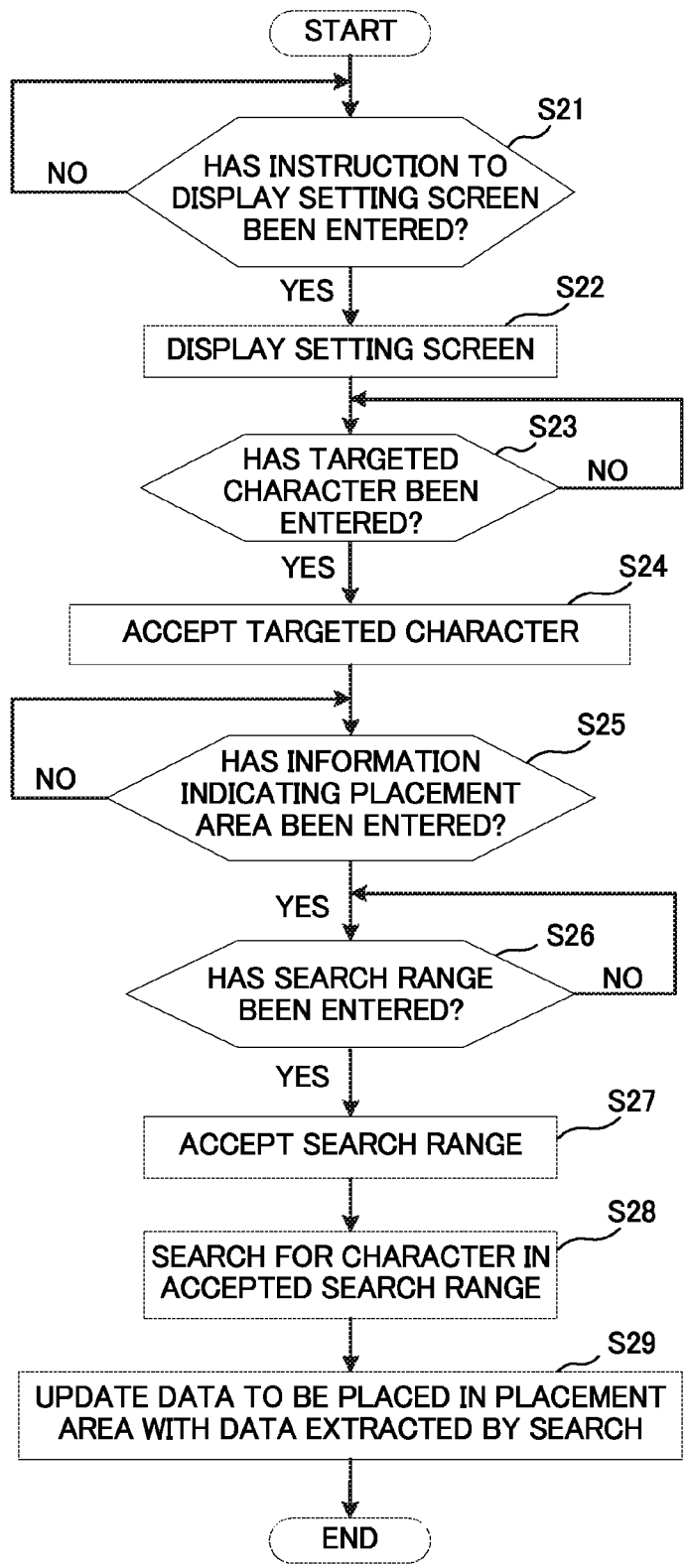
FIG. 14 is a flowchart showing the second embodiment of the processing for acquiring a piece of data to be placed in a placement area.

FIG. 14 is a flowchart showing the second embodiment of the processing for acquiring a piece of data to be placed in a placement area. A piece of data to be placed in a placement area can be acquired not only by the above acquisition method described with reference to FIG. 4 but also by the following method.

Figure 15:
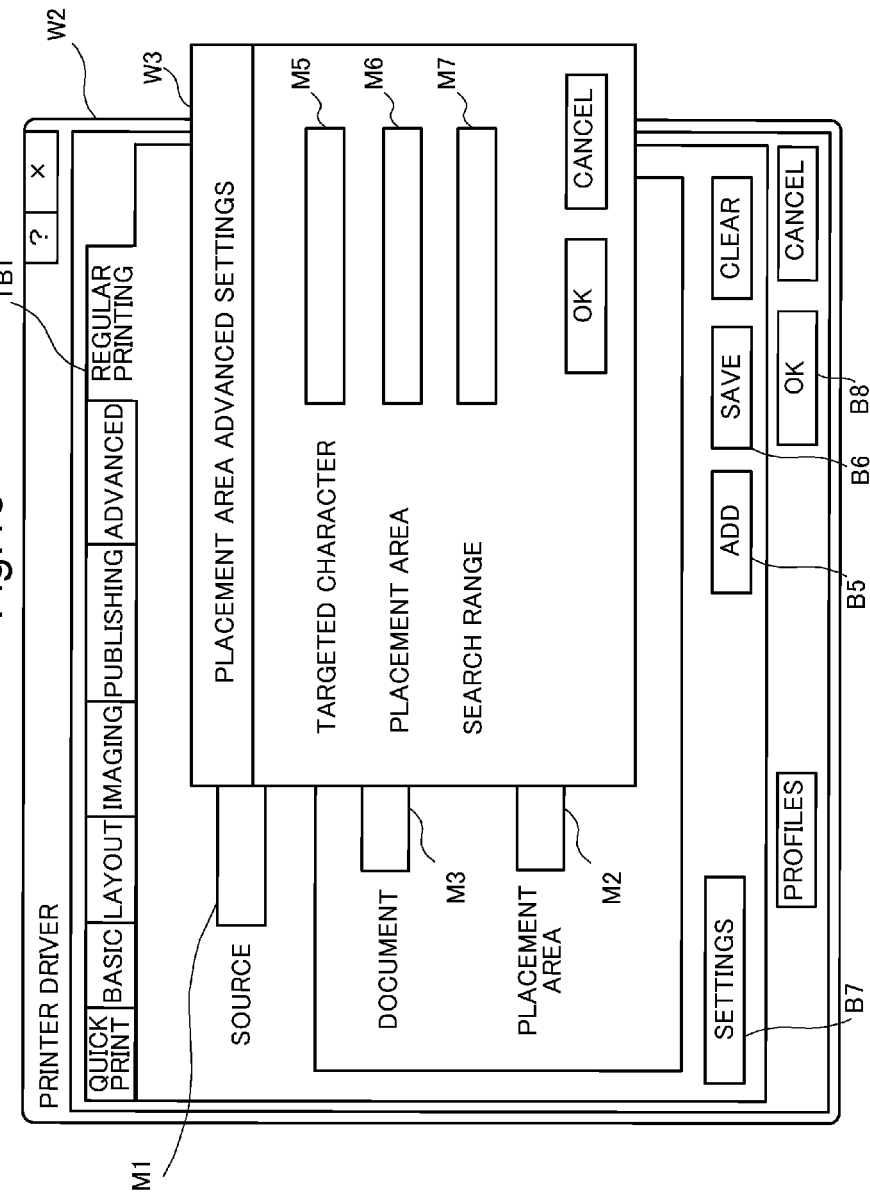
FIG. 15 is a view showing a setting screen serving as a user interface displayed on the display section during execution of the regular printing processing.

When during display of the operation screen W2 shown in FIG. 6 the user provides a click or other selection action on a Settings button B7 to enter an instruction to display a setting screen for setting a piece of data to be placed in a placement area (YES in S21), the control section 21 allows additional display of a setting screen W3 shown as an example in FIG. 15 (S22).

Items displayed on this setting screen W3 include a targeted character acceptance field M5 for accepting a character or characters targeted for search, a placement area acceptance field M6 for accepting a placement area where a piece of data containing the character or characters entered in the targeted character acceptance field M5 are to be placed, and a search range entry field M7 for accepting information defining a search range within which the character or characters are searched for.

When in this state the user selects the targeted character acceptance field M5 through the operation of the operating section 14 and subsequently enters information indicating a desired character or characters (letters, symbols or the like), for example, through the keyboard serving as the operating section 14 (YES in S23), the character acceptance section 201 accepts the entered character or characters as a target for search in the file being accepted by the file specification acceptance section 20 at the time (S24).

Furthermore, when the user selects the placement area acceptance field M6 through the operation of the operating section 14, subsequently enters information indicating a desired placement area, for example, through the keyboard serving as the operating section 14 (YES in S25), selects the search range entry field M7, and enters information indicating a desired search range, for example, information indicating a row, through the keyboard (YES in S26), the search target area acceptance section 202 accepts the search range where the character or characters accepted in S24 are to be searched for (S27). Note that no particular limitation is placed on the order of entry and acceptance of the targeted characters, the placement area, and the search range in S23 to S27.

Subsequently, the retrieval section 203 searches for and retrieves the character or characters accepted by the character acceptance section 201 from the search target area in the file accepted by the search target area acceptance section 202, the file being accepted by the file specification acceptance section 20 at the time (S28). The save location setting section 29 updates and rewrites the piece of data being stored in association with the placement area in the save location storage section 24 at the time with the piece of data extracted by the search (S29). Thereafter, the image generating section 26 places the updated piece of data into the placement area to generate a new document image.

According to the processing for acquiring a piece of data to be placed in a placement area in this embodiment, a user-desired piece of data can be accurately extracted from a file and placed in a placement area with a simpler operation.

The structure, configuration, and processing described in the above embodiments with reference to FIGS. 1 to 15 are merely illustrative and are not intended to limit the present disclosure to them.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. An image processing apparatus comprising:
   a file specification acceptance section that accepts a specification of a file to be a source to load data;
   a form storage section that stores a document for use as a form for generating a document image;

a placement area storage section that stores a plurality of placement areas indicating locations in the document stored in the form storage section, each of the locations being where a piece of the data extracted from the file the specification of which has been accepted by the file specification acceptance section is placeable;

a placement area acceptance section that accepts a specification of one placement area from the plurality of placement areas stored in the placement area storage section, the one placement area being for use of placement of the extracted piece of data;

a save location storage section that stores a save location indicating a location in the file the specification of which has been accepted by the file specification acceptance section, the location being where the piece of data to be placed in the placement area the specification of which has been accepted by the placement area acceptance section is saved;

a data extracting section that extracts, from the file the specification of which has been accepted by the file specification acceptance section, the piece of data saved in the location in the file indicated by the save location stored in the save location storage section;

an image generating section that generates an image in which the piece of data extracted by the data extracting section is placed in the placement area the specification of which has been accepted by the placement area acceptance section, the placement area being located in the document stored in the form storage section; and a save location setting section that changes, in accordance with a user's instruction, the save location indicating a location where the piece of data to be placed in the placement area is saved, the location of the placement area being stored in the placement area storage section.

2. The image processing apparatus according to claim 1, further comprising:

a placement area change acceptance section that accepts an instruction to add a placement area stored in the placement area storage section; and a placement area setting section that adds, in accordance with the instruction to add a placement area accepted by the placement area change acceptance section, the placement area stored in the placement area storage section, wherein when the placement area is added by the placement area setting section, the save location setting section sets, in accordance with a user's instruction, the save location indicating a location where a piece of data to be placed in the added placement area is saved.

3. An image processing apparatus comprising:

a file specification acceptance section that accepts a specification of a file to be a source to load data;

a form storage section that stores a document for use as a form for generating a document image;

a placement area storage section that stores a plurality of placement areas indicating locations in the document stored in the form storage section, each of the locations being where a piece of the data extracted from the file the specification of which has been accepted by the file specification acceptance section is placeable;

a placement area acceptance section that accepts a specification of one placement area from the plurality of placement areas stored in the placement area storage section, the one placement area being for use of placement of the extracted piece of data;

a save location storage section that stores a save location indicating a location in the file the specification of which has been accepted by the file specification acceptance section, the location being where the piece of data to be placed in the placement area the specification of which has been accepted by the placement area acceptance section is saved;

a data extracting section that extracts, from the file the specification of which has been accepted by the file specification acceptance section, the piece of data saved in the location in the file indicated by the save location stored in the save location storage section;

an image generating section that generates an image in which the piece of data extracted by the data extracting section is placed in the placement area the specification of which has been accepted by the placement area acceptance section, the placement area being located in the document stored in the form storage section;

a character acceptance section that accepts a character targeted for search;

a search target area acceptance section that accepts a specification of a search target area where the character accepted by the character acceptance section is to be searched for; and a retrieval section that searches for and retrieves the character accepted by the character acceptance section from the search target area accepted by the search target area acceptance section, wherein the image generating section generates the image in which, in place of the piece of data extracted from the file by the data extracting section, the character retrieved by the retrieval section is placed in the placement area the specification of which has been accepted by the placement area acceptance section.

4. A computer-readable non-transitory recording medium with an image processing program stored thereon, the image processing program allowing a computer to function as:

a file specification acceptance section that accepts a specification of a file to be a source to load data;

a form storage section that stores a document for use as a form for generating a document image;

a placement area storage section that stores a plurality of placement areas indicating locations in the document stored in the form storage section, each of the locations being where a piece of the data extracted from the file the specification of which has been accepted by the file specification acceptance section is placeable;

a placement area acceptance section that accepts a specification of one placement area from the plurality of placement areas stored in the placement area storage section, the one placement area being for use of placement of the extracted piece of data;

a save location storage section that stores a save location indicating a location in the file the specification of which has been accepted by the file specification acceptance section, the location being where the piece of data to be placed in the placement area the specification of which has been accepted by the placement area acceptance section is saved;

a data extracting section that extracts, from the file the specification of which has been accepted by the file specification acceptance section, the piece of data saved in the location in the file indicated by the save location stored in the save location storage section;

an image generating section that generates an image in which the piece of data extracted by the data extracting section is placed in the placement area the specification of which has been accepted by the placement area acceptance section, the placement area being located in the document stored in the form storage section; and a save location setting section that changes, in accordance with a user's instruction, the save location indicating a location where the piece of data to be placed in the placement area is saved, the location of the placement area being stored in the placement area storage section.

5. A computer-readable non-transitory recording medium with an image processing program stored thereon, the image processing program allowing a computer to function as:

a file specification acceptance section that accepts a specification of a file to be a source to load data;

a form storage section that stores a document for use as a form for generating a document image;

a placement area storage section that stores a plurality of placement areas indicating locations in the document stored in the form storage section, each of the locations being where a piece of the data extracted from the file the specification of which has been accepted by the file specification acceptance section is placeable;

a placement area acceptance section that accepts a specification of one placement area from the plurality of placement areas stored in the placement area storage section, the one placement area being for use of placement of the extracted piece of data;

a save location storage section that stores a save location indicating a location in the file the specification of which has been accepted by the file specification acceptance section, the location being where the piece of data to be placed in the placement area the specification of which has been accepted by the placement area acceptance section is saved;

a data extracting section that extracts, from the file the specification of which has been accepted by the file specification acceptance section, the piece of data saved in the location in the file indicated by the save location stored in the save location storage section;

an image generating section that generates an image in which the piece of data extracted by the data extracting section is placed in the placement area the specification of which has been accepted by the placement area acceptance section, the placement area being located in the document stored in the form storage section;

a character acceptance section that accepts a character targeted for search;

a search target area acceptance section that accepts a specification of a search target area where the character accepted by the character acceptance section is to be searched for; and a retrieval section that searches for and retrieves the character accepted by the character acceptance section from the search target area accepted by the search target area acceptance section, the image processing program further allowing the computer to function so that the image generating section generates the image in which, in place of the piece of data extracted from the file by the data extracting section, the character retrieved by the retrieval section is placed in the placement area the specification of which has been accepted by the placement area acceptance section.

* * * * *